United States Patent
Raysoni et al.

(10) Patent No.: US 10,472,559 B2
(45) Date of Patent: Nov. 12, 2019

(54) METHOD FOR REUSING PRODUCED WATER FOR HYDRAULIC FRACTURING

(71) Applicant: Halliburton Energy Services, Inc., Houston, TX (US)

(72) Inventors: Neelam Deepak Raysoni, Pune (IN); Snehalata Sachin Agashe, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/783,979

(22) PCT Filed: Sep. 19, 2013

(86) PCT No.: PCT/US2013/060673
§ 371 (c)(1),
(2) Date: Oct. 12, 2015

(87) PCT Pub. No.: WO2015/041656
PCT Pub. Date: Mar. 26, 2015

(65) Prior Publication Data
US 2016/0060507 A1 Mar. 3, 2016

(51) Int. Cl.
*C09K 8/68* (2006.01)
*C09K 8/52* (2006.01)
*C09K 8/88* (2006.01)
*C09K 8/90* (2006.01)

(52) U.S. Cl.
CPC ............... *C09K 8/685* (2013.01); *C09K 8/52* (2013.01); *C09K 8/887* (2013.01); *C09K 8/90* (2013.01)

(58) Field of Classification Search
None
See application file for complete search history.

(56) References Cited

U.S. PATENT DOCUMENTS

| | | |
|---|---|---|
| 4,275,789 A | 6/1981 | Lawrence et al. |
| 7,632,787 B2 | 12/2009 | Mirakyan |
| 8,408,301 B2 | 4/2013 | Lord et al. |
| 2003/0083205 A1 | 5/2003 | Crews |
| 2005/0038199 A1 | 2/2005 | Wang et al. |

(Continued)

FOREIGN PATENT DOCUMENTS

| | | |
|---|---|---|
| EP | 1490580 B1 | 4/2010 |
| WO | WO-2015041656 A1 | 3/2015 |
| WO | WO-2015041656 A8 | 3/2015 |

OTHER PUBLICATIONS

"International Application Serial No PCT/US2013/060673, International Preliminary Report on Patentability dated Mar. 31, 2016", 12 pgs.

(Continued)

*Primary Examiner* — Jeffrey D Washville
(74) *Attorney, Agent, or Firm* — Chamberlain Hrdlicka

(57) ABSTRACT

A method comprises obtaining or providing a treatment fluid comprising a gellable agent; an aqueous carrier fluid; at least one polymer comprising one or more ortho-dioxy arylene units; a crosslinking agent; and placing the treatment fluid in a subterranean formation. In some embodiments, the aqueous carrier fluid comprises produced and/or flowback water. In some embodiments, the aqueous carrier fluid comprises high total dissolved solids, including multivalent salts or both monovalent and multivalent salts.

47 Claims, 5 Drawing Sheets

(56) References Cited

U.S. PATENT DOCUMENTS

| | | |
|---|---|---|
| 2005/0061507 A1 | 3/2005 | Hanes, Jr. |
| 2007/0187097 A1 | 8/2007 | Weaver et al. |
| 2012/0220503 A1* | 8/2012 | Sanchez Reyes ...... C09K 8/685 507/213 |
| 2012/0267103 A1 | 10/2012 | Willberg |

OTHER PUBLICATIONS

"International Application Serial No. PCT/US2013/060673, International Search Report dated Jun 23, 2014", 3 pgs.
"International Application Serial No. PCT/US2013/060673, Written Opinion dated Jun 23, 2014", 10 pgs.

* cited by examiner

METHOD FOR REUSING PRODUCED WATER FOR HYDRAULIC FRACTURING

PRIORITY APPLICATION

This application is a U.S National Stage Filing Under 35 U.S.C. 0 371 from International Application No. PCT/US2013/060673, filed 19 Sep. 2013; and published as WO 2015/041656 on 26 Mar. 2015; which application and publication are incorporated herein by reference in their entirety.

BACKGROUND OF THE INVENTION

During the drilling, completion, and production phases of wells for petroleum extraction, the downhole use of compositions having high viscosities, including gels, is important for a wide variety of purposes. Higher viscosity fluids can more effectively carry materials (e.g., proppants) to a desired location downhole. Similarly, higher viscosity fluids can more effectively carry materials away from a drilling location downhole. Further, the use of higher viscosity fluids during hydraulic fracturing generally results in larger, more dominant fractures.

Higher viscosity fluids are often prepared using fresh water, brine or sea water as base component. Fresh water, however, can be a scarce and costly resource, depending on where the fluid is being prepared or used. Further, at a wellsite, whether onshore or offshore, handling, storing, and disposal of flowback or produced water can become a significant issue, as well as an environmental concern. The present disclosure, therefore, relates to methods for reusing flowback, as well as produced water, as carrier fluid for preparing treatment fluids, including fracturing fluids.

SUMMARY OF THE INVENTION

Because of its relative abundance at a wellsite, it would be desirable to use produced or flowback water to prepare higher viscosity fluids. Produced or flowback water, however, contains high amounts of total dissolved solids (hereinafter "TDS"), including multivalent salts, which can adversely affect the performance of higher viscosity fluids. For example, the presence of high TDS can limit, the viscosity of drilling and/or fracturing fluids.

The pH is an important factor for obtaining appropriate performance of fracturing fluids. Higher TDS tends to bring down the pH of the produced water. Most of the crosslinkers added into fracturing fluids, require high alkalinity (e.g., pH>8) to give high viscosity to the fluid. But maintaining high alkalinity poses its own challenge, as the addition of buffer solutions often leads to precipitation of the salts and formation of "fisheyes." These "fisheyes" prevent the fluid viscosity from building and prevent the maintenance of uniform viscosity.

Accordingly, produced or flowback water is difficult to use as-is for the preparation of higher viscosity fluids such as fracturing fluids. In various embodiments, the present invention provides a method of treating a subterranean formation. The method includes treating a subterranean formation with a fluid that may be prepared using an aqueous carrier fluid primarily comprising produced and/or flowback water, in some instances in addition to fresh or sea water. In some embodiments, the aqueous carrier fluid comprises high total dissolved solids, including multivalent salts or both monovalent and multivalent salts.

In various embodiments, the invention relates to a method comprising obtaining or providing a treatment fluid comprising a gellable agent; an aqueous carrier fluid; at least one polymer comprising one or more ortho-dioxy arylene units; and a crosslinking agent; and placing the treatment fluid in a subterranean formation.

In various other embodiments, the invention relates to a method comprising placing a treatment fluid comprising a gellable agent; an aqueous carrier fluid; at least one polymer comprising one or more ortho-dioxy arylene units; and a crosslinking agent; in a subterranean formation.

In still other embodiments, the invention relates to a method comprising placing a treatment fluid comprising a gellable agent comprising a galactomannan gum; an aqueous carrier fluid comprising seawater, produced water, flowback water, fresh water, saltwater or combinations thereof; at least one polymer comprising one or more ortho-dioxy arylene units comprising ammonium lignosulfonate, calcium lignosulfonate or combinations thereof; and a crosslinking agent; in a subterranean formation.

In yet other embodiments, the invention relates to a composition comprising a gellable agent; an aqueous carrier fluid; at least one polymer comprising one or more ortho-dioxy arylene units; and a crosslinking agent.

In various other embodiments, the invention relates to relates to a system comprising a treatment fluid comprising a gellable agent; an aqueous carrier fluid; at least one polymer comprising one or more ortho-dioxy arylene units; and a crosslinking agent; and a subterranean formation comprising the treatment fluid.

BRIEF DESCRIPTION OF THE FIGURES

The drawings illustrate generally, by way of example, but not by way of limitation, various embodiments discussed in the present document.

DETAILED DESCRIPTION OF THE INVENTION

Figure 1:
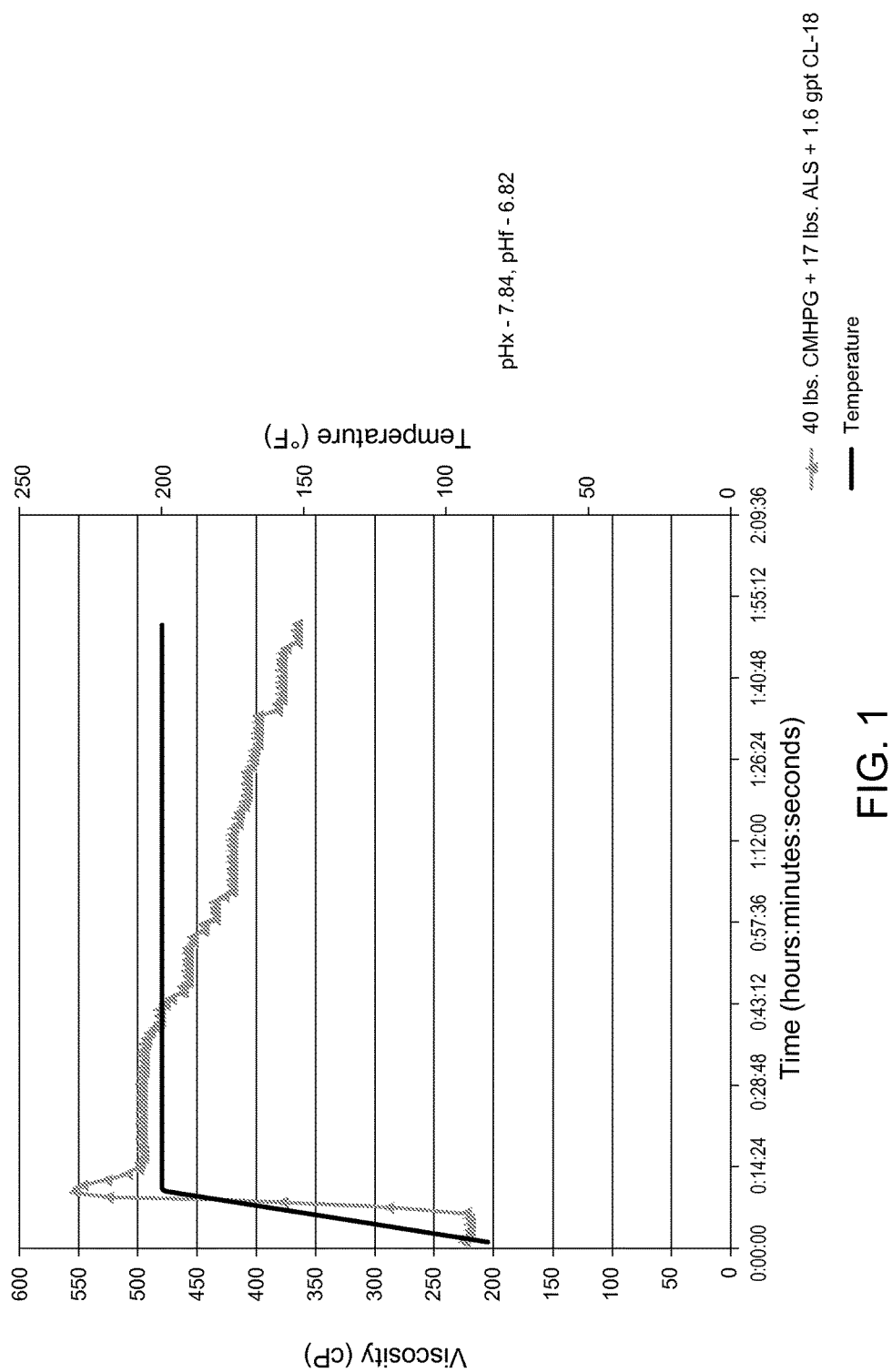
FIG. 1 is rheology profile for a representative treatment fluid at 200° F., the treatment fluid comprising 40 lbs. carboxymethylhydroxypropylguar (CMHPG), 17 lbs. ammonium lignosulfonate (ALS), henceforth referred to as "ALS," 1.6 gpt CL-18™, and synthetic produced water (pHx 7.84 and pHf 6.82).

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Values expressed in a range format should be interpreted in a flexible manner to include not only the numerical values explicitly recited as the limits of the range, but also to include all the individual numerical values or sub-ranges encompassed within that range as if each numerical value and sub-range were explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. In addition, it is to be understood that the phraseology or terminology employed herein, and not otherwise defined, is for the purpose of description only and not of limitation. Any use of section headings is intended to aid reading of the document and is not to be interpreted as limiting. Further, information that is relevant to a section heading may occur within or outside of that particular section. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods described herein, the steps can be carried out in any order without departing from the principles of the invention, except when a temporal or operational sequence is explicitly recited. Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "downhole" as used herein refers to under the surface of the earth, such as a location within or fluidly connected to a wellbore.

As used herein, the term "fluid" refers to liquids and gels, unless otherwise indicated.

As used herein, the term "subterranean material" or "subterranean formation" refers to any material under the surface of the earth, including under the surface of the bottom of the ocean. For example, a subterranean formation or material can be any section of a wellbore and any section of a subterranean petroleum- or water-producing formation or region in fluid contact with the wellbore; placing a material in a subterranean formation can include contacting the material with any section of a wellbore or with any subterranean region in fluid contact therewith. Subterranean materials can include any materials placed into the wellbore such as drill shafts, liners, tubing, or screens; placing a material in a subterranean formation can include contacting with such subterranean materials. In some examples, a subterranean formation or material can be any below-ground region that can produce liquid or gaseous petroleum materials, water, or any section below-ground in fluid contact therewith. For example, a subterranean formation or material can be an area desired to be fractured, a fracture or an area surrounding a fracture, a flow pathway or an area surrounding a flow pathway, wherein a fracture or a flow pathway can be optionally fluidly connected to a subterranean petroleum- or water-producing region, directly or through one or more fractures or flow pathways.

As used herein "treatment of a subterranean formation" can include any activity directed to extraction of water or petroleum materials from a subterranean petroleum- or water-producing formation or region, for example, including drilling, stimulation, hydraulic fracturing, clean-up, acidization, completion, remedial treatment, abandonment, and the like.

As used herein, a "flow pathway" downhole can include any suitable subterranean flow pathway through which two subterranean locations are in fluid connection. The flow pathway can be sufficient for petroleum or water to flow from one subterranean location to the wellbore, or vice-versa. A flow pathway can include at least one of a hydraulic fracture, a fluid connection across a screen, gravel pack, across proppant, including across resin-bonded proppant or proppant deposited in a fracture, and across sand. A flow pathway can include a natural subterranean passageway through which fluids can flow. In some embodiments, a flow pathway can be a water source and can include water. In some embodiments, a flow pathway can be a petroleum source and can include petroleum. In some embodiments, a flow pathway can sufficient to divert from a wellbore, fracture, or flow pathway connected thereto at least one of water, a downhole fluid, or a produced hydrocarbon.

Embodiments of the present invention relate to treatment fluids. More specifically, embodiments of the present invention relate to treatment fluids comprising, among other things, a gellable agent, at least one polymer (e.g., one or more) comprising one or more ortho-dioxy arylene units; and a crosslinking agent and methods of using the treatment fluids in subterranean formations penetrated by well bores.

As used herein, the term "treatment fluids" refers generally to any fluid that may be used in a subterranean application in conjunction with a desired function and/or for a desired purpose. The term "treatment fluid" does not imply any particular action by the fluid or any component thereof. As a result, the present compositions can be inexpensive and simple to prepare, using either batch mixing or on-the-fly procedures. In some embodiments, the term "treatment fluids" includes, but is not limited to drilling fluids, stimulation fluids, clean-up fluids, fracturing fluids, spotting fluids, production fluids, completion fluids, remedial treatment fluids, abandonment fluids, acidizing fluids, water control materials, packing fluids or combinations thereof.

As used herein, the term "drilling fluid" refers to fluids, slurries, or muds used in drilling operations downhole, such as the formation of a wellbore.

As used herein, the term "stimulation fluid" refers to fluids or slurries used downhole during stimulation activities of the well that can increase the production of a well, including perforation activities. In some examples, a stimulation fluid can include a fracturing fluid or an acidizing fluid.

As used herein, the term "clean-up fluid" refers to fluids or slurries used downhole during clean-up activities of the well, such as any treatment to remove material obstructing the flow of desired material from the subterranean formation. In one example, a clean-up fluid can be an acidification treatment to remove material formed by one or more perforation treatments. In another example, a clean-up fluid can be used to remove a filter cake.

As used herein, the term "fracturing fluid" refers to fluids or slurries used downhole during fracturing operations.

As used herein, the term "spotting fluid" refers to fluids or slurries used downhole during spotting operations and can be any fluid designed for localized treatment of a downhole region. In one example, a spotting fluid can include a lost circulation material for treatment of a specific section of a wellbore, such as to seal off fractures in a wellbore and prevent sag. In another example, a spotting fluid can include a water control material. In some examples, a spotting fluid can be designed to free a stuck piece of drilling or extraction equipment; can reduce torque and drag with drilling lubricants; prevent differential sticking; promote wellbore stability; and can help to control mud weight.

As used herein, the term "production fluid" refers to fluids or slurries used downhole during the production phase of a well. Production fluids can include downhole treatments designed to maintain or increase the production rate of a well, such as perforation treatments, clean-up treatments or remedial treatments.

As used herein, the term "completion fluid" refers to fluids or slurries used downhole during the completion phase of a well.

As used herein, the term "remedial treatment fluid" refers to fluids or slurries used downhole for remedial treatment of a well. Remedial treatments can include treatments designed to increase or maintain the production rate of a well, such as stimulation or clean-up treatments.

As used herein, the term "abandonment fluid" refers to fluids or slurries used downhole during or preceding the abandonment phase of a well.

As used herein, the term "acidizing fluid" refers to fluids or slurries used downhole during acidizing treatments downhole. In one example, an acidizing fluid is used in a clean-up operation to remove material obstructing the flow of desired material, such as material formed during a perforation operation. In some examples, an acidizing fluid can be used for damage removal.

As used herein, the term "water control material" refers to a solid or liquid material that interacts with aqueous material downhole, such that hydrophobic material can more easily travel to the surface and such that hydrophilic material (including water) can less easily travel to the surface. A water control material can be used to treat a well to cause the proportion of water produced to decrease and to cause the proportion of hydrocarbons produced to increase, such as by selectively binding together material between water-producing subterranean formations and the wellbore while still allowing hydrocarbon-producing formations to maintain output.

As used herein, the term "packing fluid" refers to fluids or slurries that can be placed in the annular region of a well, between tubing and outer casing above a packer. In various examples, the packer fluid can provide hydrostatic pressure in order to lower differential pressure across a sealing element; lower differential pressure on the wellbore and casing to prevent collapse; and protect metals and elastomers from corrosion.

One advantage of the treatment fluids of the present invention is that the fluids can be prepared with any aqueous fluid, including seawater pumped from the ocean at the site of the treatment operation, wherever the job happens to be; produced water; and/or flowback water. In some embodiments, the aqueous fluid may comprise high total dissolved solids, including monovalent salts, multivalent salts or both monovalent and multivalent salts.

Another advantage is that the treatment fluids of the present invention are stable at temperatures above about 200° F. (e.g., above about 220° F., above about 250° F. or above about 300° F., from about 200° F. to about 300° F., from about 200° F. to about 350° F., from about 200° F. to about 250° F., from about 220° F. to about 350° F., from about 250° F. to about 350° F. or from about 300° F. to about 350° F.) and at a pH of from about 7.5 to about 10.

In some embodiments, the treatment fluids of the present invention may be used at temperatures ranging from about 70° F. to about 250° F., e.g., from about 100° F. to about 250° F. or from about 150° F. to about 250° F. and at a pH of from about 7.5 to about 9.

As used herein, the term "salts" include, but are not limited to, any salt of a Group I (alkali metals) or Group II (alkaline earth metal) element, including salts of sodium, potassium, magnesium, calcium, strontium, and barium. Such salts include the bicarbonate, bromide, chloride, sulfate, nitrate, nitrite, and phosphate salts of Group I or Group II elements. The term "salts" also includes iron salts, including the sulfate and nitrate salts of iron. The term also includes aluminum salts (e.g., aluminum chloride and aluminum sulfate) and chromium salts (e.g., chromium sulfate and the like).

As used herein, the term "high total dissolved solids" broadly refers to total dissolved solids ranging from about 20,000 mg/L to 250,000 mg/L, e.g., 50,000 mg/L to about 100,000 mg/L, from about 75,000 mg/L to about 150,000 mg/L, from about 100,000 mg/L to about 200,000 mg/L, from about 60,000 mg/L to about 150,000 mg/L or from about 50,000 to about 200,000 mg/L.

As used herein "flowback water" includes, but is not limited to the murky, salty water that is produced after fracturing a formation for hydrocarbon production. Flowback water can contain fracturing fluid, that returns to the surface, also known as fracturing load recovery, as well as produced water. In some instances, flowback water can contain clay, dirt, metal salts, chemicals, and diesel or other hydrocarbons that may have been added. Flowback water may have high total dissolved solids, including multivalent salts.

As used herein, the term "produced water" includes, but is not limited to naturally occurring water found in, among other places, sedimentary formations like shale, sandstone, and coal beds. Produced water may have high total dissolved solids, including multivalent salts.

In general, the treatment fluids of the present invention comprise among other things, a gellable agent, at least one polymer comprising one or more ortho-dioxy arylene units; and a crosslinking agent. In some embodiments, the at least one polymer comprising one or more ortho-dioxy arylene units can comprise functional groups (e.g., sulfonate and phosphate groups) that allow the at least one polymer comprising one or more ortho-dioxy arylene units to act as a buffer. In an embodiment, the treatment fluid is used as a fracturing fluid.

The crosslinking agent acts to at least crosslink the gellable agent. In some instances, the crosslinking agent is activated within a specific pH range for which a suitable pH-adjusting agent, such as sodium bicarbonate or sodium hydroxide (or any pH adjusting agent described herein), may be used to adjust the pH to within the specific pH range. In some embodiments, the pH may be adjusted to between 8 and 10. In some instances, the gellable agent and the crosslinking agent may be combined, followed by adjustment of the pH, thus activating the crosslinking agent. The at least one polymer comprising one or more ortho-dioxy arylene units can be added thereafter. Alternatively, the at least one polymer comprising one or more ortho-dioxy arylene units can be combined with the gellable agent, prior to the addition of the crosslinking agent, followed by adjustment of the pH. In another alternative, the crosslinking agent may be combined with the least one polymer comprising one or more ortho-dioxy arylene units, followed by the addition of the gellabe agent and adjustment of the pH. In still another alternative, the at least one polymer comprising one or more ortho-dioxy arylene units can be combined with the gellable agent, and the crosslinking agent simultaneously, followed by adjustment of the pH. In any of the foregoing alternatives, a complex of crosslinked gellable agent, crosslinking agent, and at least one polymer comprising one or more ortho-dioxy arylene units may be formed that maintains high viscosity of, e.g., a fracturing fluid, even at higher temperatures.

When the at least one polymer comprising one or more ortho-dioxy arylene units can act as a buffer, the addition of the at least one polymer comprising one or more ortho-dioxy arylene units can raise the pH from 6.5 to about 8 or from about 8.5 to 9.5, thus eliminating the need to use additional buffering agents or other pH adjusting agents other than the at least one polymer comprising one or more ortho-dioxy arylene units to effect the activation of the crosslinking agent. In some instances, therefore, the crosslinking agent can be activated by simply combining it with the at least one polymer comprising one or more ortho-dioxy arylene units, prior to the addition of the gellable agent. Alternatively, the at least one polymer comprising one or more ortho-dioxy arylene units can be combined with the gellable agent, prior to the addition of the crosslinking agent. In another alternative, the crosslinking agent may be combined with the gellabe agent, followed by the addition of the at least one polymer comprising one or more ortho-dioxy arylene units. In still another alternative, the at least one polymer comprising one or more ortho-dioxy arylene units can be combined with the gellable agent, and the crosslinking agent simultaneously. In any of the foregoing alternatives, a complex of crosslinked gellable agent, crosslinking agent, and at least one polymer comprising one or more ortho-dioxy arylene units may be formed that maintains high viscosity of, e.g., a fracturing fluid, even at higher temperatures. In some instances, even if the at least one polymer comprising one or more ortho-dioxy arylene units can act as a buffer, the pH may optionally be adjusted within a specific pH range (e.g., between 8 and 10) using a suitable pH-adjusting agent, such as sodium bicarbonate or sodium hydroxide. One reason why one would use a suitable pH-adjusting agent would be to provide additional stability to a treatment fluid at higher temperatures (e.g., >300° F.) or to increase the pH beyond 9.5 or 10.

While not wishing to be bound by any theory, it is believed that the at least one polymer comprising one or more ortho-dioxy arylene units acts to stabilize the crosslinked gellable agent by, among other things, interacting (e.g., complexing) with the crosslinking agent, thereby stabilizing the crosslinked gellable agent. It is believed that lone pairs on the ortho-dioxy arylene units complex with growing metal complex colloidal particles, when the crosslinking agent is a metal complex (e.g., a titanium complex). The stabilization of the crosslinked gellable agent results in the maintenance of a high viscosity (e.g., above 250 cP) of the crosslinked gellable agent over a period of time (e.g., two hours or more), even at elevated temperatures (e.g., from about 200° F. to about 250° F.) and shear (e.g., 81 sec-1). It is also believed that the at least one polymer comprising one or more ortho-dioxy arylene units acts as a barrier that delays the crosslinking of the gellable agent, such that the crosslinking occurs slowly at first, but its rate increases with time.

In some embodiments the crosslinking of the gellable agent with the crosslinking agent occurs above the surface, en route to a downhole location, at a downhole location or combinations thereof.

In some embodiments, the treatment fluids of the present invention have a viscosity that is sufficiently high for them to be used as treatment fluids, especially fracturing fluids. As used herein, the term "sufficiently high," as it refers to viscosity, is a viscosity ranging from about 300 cP to about 600 cP (e.g., from about 300 cP to about 400 cP or from about 350 cP to about 450 cP) at a shear rate of about 80 $sec^{-1}$ at a temperature from about 200° F. to about 300° F. In some embodiments, the treatment fluids of the present invention have a viscosity of from about 300 cP to about 600 cP (e.g., from about 300 cP to about 400 cP or from about 350 cP to about 450 cP) at a shear rate of about 80 $sec^{-1}$ at a temperature from about 200° F. to about 250° F. for at least 2 hours, for at least 3 hours, for at least 4 hours, for at least 5 hours, e.g., from about 2 hours to about 5 hours after they are prepared.

The aqueous carrier fluid used in the treatment fluids of the embodiments of the present invention comprises one or more aqueous fluids. For example, the aqueous carrier fluid may include, but is not limited to, seawater, produced water, flowback water, fresh water, saltwater (e.g., water containing one or more salts dissolved therein), brine (e.g., saturated saltwater), weighted brine (e.g., an aqueous solution of sodium bromide, calcium bromide, zinc bromide and the like), or any combination thereof. Generally, the aqueous fluid may be from any source, provided that it does not contain components that might adversely affect the stability and/or performance of the treatment fluids of the embodiments of the present invention. In certain embodiments, the density of the aqueous carrier fluid can be increased, among other purposes, to provide additional particle transport and suspension in the treatment fluids of the embodiments of the present invention.

In certain embodiments, the pH of the aqueous carrier fluid may be adjusted (e.g., by a buffer or other pH adjusting agent) prior to the preparation of the treatment fluids to, among other things, further facilitate hydration of the gellable agent; to activate a crosslinking agent; and/or to reduce the viscosity of the treatment fluid (e.g., activate a breaker, deactivate a crosslinking agent). The pH may be adjusted to a specific level, which may depend on, among other factors, the types of gellable agents and/or crosslinking agents in the treatment fluid. In general, the pH of the fluid may be about 10 or less (e.g., from about 7.5 to about 10, from about 8.5 to about 9.5, from about 8 to about 9, from about 8.5 to 10 or from about 9 to about 10) when a stable gelled fluid is desired. Suitable pH adjusting agents include any compounds capable of altering the pH of the treatment fluid. Examples of such compounds that may be used include, but are not limited to, formic acid, acetic acid, acetic anhydride, sodium hydroxide, potassium hydroxide, various carbonates (e.g., sodium bicarbonate), any combination thereof, or any other commonly used pH control agent that does not adversely react with the gellable agent, crosslinking agent or the at least one polymer comprising one or more ortho-dioxy arylene units to prevent its use in accordance with the method of the present invention. When used, the pH-adjusting compound is generally present in a treatment concentrate of the present invention in an amount in the range of from about 0.5% to about 10% by weight of the aqueous fluid therein. In another embodiment, the pH-adjusting compound is generally present in a treatment fluid of the present invention in an amount in the range of from about 0.01% to about 0.3% by weight of the aqueous fluid therein. In an embodiment, the pH adjusting agent comprises sodium hydroxide and is present in an amount from about 0.01 gallons per thousand gallons of treatment fluid ("gpt") to about 2 gpt. One of ordinary skill in the art, with the benefit of this disclosure, will recognize if/when such density and/or pH adjustments are appropriate.

The treatment fluids of the embodiments of the present invention comprise a suitable gellable agent, where the gellable agent is preferably a crosslinkable gellable agent. The gellable agent is present to increase the viscosity of the treatment fluid. The gellable agent may be any suitable gellable agent that is capable of being crosslinked by a crosslinking agent; is compatible with the aqueous carrier fluid; and is compatible with the at least one polymer comprising one or more ortho-dioxy arylene units. Suitable gellable agents may comprise galactomannan gums, including modified or derivatized galactomannan gums. Examples of such galactomannan gums include, but are not limited to guar gum, hydroxypropylguar, carboxymethylhydroxypropylguar (CMHPG), carboxymethylguar, and any combination thereof. Additional examples of gellable agents which may be utilized in the present invention include but are not limited to cellulose and derivatized cellulose, including carboxymethylcellulose and carboxymethylhydroxy-ethylcellulose, phosphonated cellulose and any combination thereof. Gellable agents also include other natural or synthetic polymers such as xanthan gum, diutan gum, alginates, carrageeenan, and other hydrocollides such as alginic acid, beta-glucan, chicle gum, dammar gum, gellan gum, guar gum, gum arabic, gum ghatti, gum tragachanth, karava gum, locust bean gum, mastic gum, psyllium seed husks, sodium alginate, spruce gum, tara gum, xanthan gum, hydroxypropyl guar, carboxymethyl hydroxypropyl guar, and any combinations thereof. Other gellable agents that are known in the art, but which are not specifically mentioned herein, can also be utilized.

The gellable agent may be present in the treatment fluid in an amount in the range of from about 10 to about 100 pounds per 1000 gallons of the aqueous carrier fluid, e.g., from about 10 to about 50 pounds, from about 10 to about 30 pounds, from about 20 to about 50 pounds, from about 30 to about 50 pounds or from about 15 to about 30 pounds per 1000 gallons of aqueous carrier fluid. The aqueous carrier fluid is generally present in the treatment fluid in at least an amount sufficient to hydrate the gellable agent.

The treatment fluids of the present invention also comprise at least one polymer (e.g., one or more) comprising one or more ortho-dioxy arylene units. As used herein, the term "arylene" broadly refers to cyclic aromatic hydrocarbons that do not contain heteroatoms in the ring. Arylene groups include, but are not limited to, phenyl, biphenyl, and naphthyl groups. In some embodiments, aryl groups contain about 6 to about 14 carbons in the ring portions of the groups. In some embodiments, ortho-dioxy arylene units include, but are not limited to, units having the formula (I) or (II), though the at least one polymer comprising one or more ortho-dioxy arylene units may have units of the formulae (I) and (II):

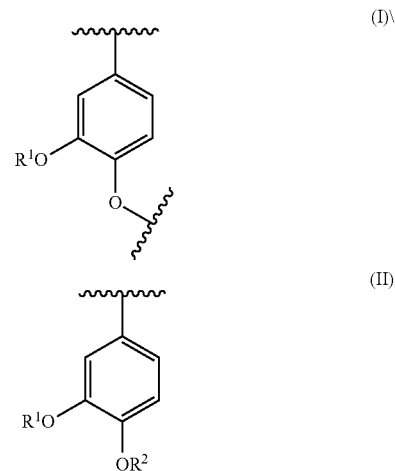

wherein each $R^1$ and $R^2$ is independently hydrogen or alkyl.

As used herein, the term "alkyl" broadly refers to straight chain and branched alkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl.

In some embodiments, in the units of formula (I), $R^1$ is hydrogen or methyl. In some embodiments, in the units of formula (II), $R^1$ is hydrogen or methyl; $R^2$ is hydrogen or methyl; or $R^1$ is methyl and $R^2$ is hydrogen. In some embodiments, the at least one polymer comprising one or more ortho-dioxy arylene units may have units of the formulae (I) and (II), wherein $R^1$ in the units of formula (I) is methyl and, in the units of formula (II), $R^1$ is methyl and $R^2$ is hydrogen.

In some embodiments, the at least one polymer comprising one or more ortho-dioxy arylene units includes, but is not limited to, polymers comprising one or more ortho-dioxy arylene units that are derived from plant sources. In some embodiments, the at least one polymer comprising one or more ortho-dioxy arylene units includes, but is not limited to, the sulfonate and sulfonic acid derivatives of lignin. The sulfonate and sulfonic acid derivatives of lignin include, but are not limited to ammonium lignosulfonate (ALS), calcium lignosulfonate, salts of lignosulfonic acid, other alkaline lignosulfonates, and combinations thereof. In some embodiments, the at least one polymer comprising one or more ortho-dioxy arylene units comprises ammonium lignosulfonate, calcium lignosulfonate or combinations thereof.

In some embodiments, catechol may be used in addition to or in place of the at least one polymer comprising one or more ortho-dioxy arylene units.

The at least one polymer comprising one or more ortho-dioxy arylene units may be present in the treatment fluid in an amount in the range of from about 5 to about 25 pounds per 1000 gallons of the aqueous carrier fluid, e.g., from about 5 to about 15 pounds, from about 10 to about 25 pounds, from about 15 to about 25 pounds or from about 5 to about 25 pounds per 1000 gallons of aqueous carrier fluid.

The treatment fluids of the present invention also comprise a suitable crosslinking agent that, among other things, crosslinks the gellable agent and/or forms a complex with the at least one polymer comprising one or more ortho-dioxy arylene units and the crosslinked gellable agent. The term "crosslinking agent" is defined herein to include any molecule, atom, or ion that is capable of forming one or more crosslinks between molecules of the gellable agent; between one or more atoms in a single molecule of the gellable agent; and/or forms a complex with the at least one polymer comprising one or more ortho-dioxy arylene units and the crosslinked gellable agent.

The crosslinking agent in the treatment fluids of the present invention may comprise a metal ion that is capable of crosslinking at least two molecules of the gellable agent and/or capable of forming a complex with the at least one polymer comprising one or more ortho-dioxy arylene units and the crosslinked gellable agent. Examples of suitable crosslinking agents include, but are not limited to, borate ions and zirconium ions. These ions may be provided by providing any compound that is capable of producing one or more of these ions. Examples of such compounds include, but are not limited to, boric acid, disodium octaborate tetrahydrate, sodium diborate, pentaborates, ulexite, colemanite, zirconium oxychloride, chelates of zirconium, derivatives thereof, and combinations thereof. Suitable crosslinking agents also include titanium based compounds such as titanium oxychloride or organic titanates, such as titanium chloride and triethyl amine complexes, and aluminium based compounds, such as aluminium acetate, organo aluminium complexes, and the like.

In certain embodiments of the present invention, once the gellable agent is hydrated at a pH of from about 6.5 to about 7, then the pH may be adjusted to increase the alkalinity to from about 7.5 to about 9. Since, in some instances, the crosslinking is effected at high alkaline pH, the required amount of crosslinker may be added to the solution.

Suitable crosslinking agents may be present in the treatment fluids of the present invention in an amount sufficient to provide, among other things, the desired degree of crosslinking between molecules of the gellable agent and/or form a complex with the at least one polymer comprising one or more ortho-dioxy arylene units and the crosslinked gellable agent. In certain embodiments, the crosslinking agent may be present in the treatment fluids of the present invention in an amount in the range of from about 0.1 to about 0.5 gpt, e.g., from about 0.2 to about 0.4 gpt or from about 0.1 to about 0.3 gpt. One with ordinary skill in the art, with the benefit of this disclosure, will recognize the appropriate type and amount of crosslinking agent to include in a treatment fluid of the present invention based on, among other things, the temperature conditions of a particular application; the type of gellable agent used; the molecular weight of the gellable agent; the degree of rheological modification desired; and/or the pH of the treatment fluid. In an embodiment, the crosslinking agent may be capable of crosslinking the gellable agent and/or forming a complex with the at least one polymer comprising one or more ortho-dioxy arylene units and the crosslinked gellable agent at a pH of about 10 or less (e.g., from about 7.5 to about 10, from about 8.5 to about 9.5, from about 8 to about 9, from about 8.5 to 10 or from about 9 to about 10). In an embodiment, the crosslinking agent may be capable of crosslinking the gellable agent and/or form a complex with the at least one polymer comprising one or more ortho-dioxy arylene units and the crosslinked gellable agent at a temperature ranging from about 200° F. to about 325° F., from about 250° F. to about 325° F., from about 250° F. to about 300° F., from about 215° F. to about 300° F. or from about 215° F. to about 275° F.

The crosslinking agents may be provided or used in any suitable form. For instance, the crosslinking agents may be a liquid, a gel, an emulsion, or a solid. In some embodiments, a crosslinking agent may be dissolved, suspended, or emulsified in a liquid. The crosslinking agent utilized in the present invention may be capable of causing delayed crosslinking of the gellable agent for pipe transit times greater than 5 minutes. Thus, the delay in crosslinking exhibited by compositions of the present invention may be about 5 minutes or more. A delayed release may be desirable when a subterranean operation involves high temperature conditions, and in a deep well or in a well requiring a long pump time. In some embodiments, the crosslinking agent may be capable of causing an accelerated crosslinking of the gellable agent. Such acceleration may be desirable due to the conditions of the treatment fluid and the expected conditions within the subterranean formation. For example, the temperature of the formation may make it desirable to include an accelerated crosslinking agent in the treatment fluid. Suitable accelerated crosslinking agents may include, but are not limited to, instant borate, instant zirconium, instant titanium or any combination thereof. The composition of the crosslinking agent and/or the at least one polymer comprising one or more ortho-dioxy arylene units can affect the rate of crosslinking of the gellable agent.

In some embodiments, the treatment fluids of the present invention may comprise particulates, such as proppant particulates, gravel particulates or pre-cured-resin-coated proppant particulates. Particulates suitable for use in the present invention may comprise any material suitable for use in subterranean operations. Suitable materials for these particulates include, but are not limited to, sand, bauxite, ceramic materials, glass materials, polymer materials, Teflon® materials, nut shell pieces, cured resinous particulates comprising nut shell pieces, seed shell pieces, cured resinous particulates comprising fruit pit pieces, wood, composite particulates, and combinations thereof. Suitable composite particulates may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof. The particulate size generally may range from about 2 mesh to about 400 mesh or smaller on the U.S. Sieve Series; however, in certain circumstances, other sizes may be desired and will be entirely suitable for practice of the present invention. In particular embodiments, preferred particulates size distribution ranges are one or more of 6/12, 8/16, 12/20, 16/30, 20/40, 30/50, 40/60, 40/70, or 50/70 mesh. Also, mixtures of particulates may be used having different particle size distribution ranges to enhance the packed volume of the proppant particulates within a fracture. See, e.g., Published U.S. Appl. No. 2013/0220619. It should be understood that the term "particulate," as used in this disclosure, includes all known shapes of materials, including substantially spherical materials, fibrous materials, polygonal materials (such as cubic materials), and mixtures thereof. Moreover, fibrous materials, that may or may not be used to bear the pressure of a closed fracture, may be included in certain embodiments of the present invention. In certain embodiments, the particulates included in the treatment fluids of the present invention may be coated with any suitable resin or tackifying agent known to those of ordinary skill in the art. In certain embodiments, the particulates may be present in the treatment fluids of the present invention in an amount in the range of from about 0.5 pounds per gallon ("ppg") to about 30 ppg by volume of the treatment fluid.

The treatment fluid of the embodiments of the present invention can also comprise a gel breaker which "breaks" or diminishes the viscosity of the fracturing fluid so that it is more easily recovered from the fracture during clean up. Examples of gel breakers suitable for use with the treatment fluids of the embodiments of the present invention include oxidizing agents, enzymes, acids, and any combination thereof, with oxidizing agents being the most preferred. In an embodiment, the gel breaker may comprise a delayed gel breaker. Examples of delayed gel breakers that may be used include, but are not limited to, various lactones, esters, encapsulated acids and slowly soluble acid generating compounds, oxidizers which produce acids upon reaction with water (such as polyesters or polyorthoesters), water reactive metals such as aluminum, lithium and magnesium and the like. In certain embodiments, the delayed gel breaker is an ester. Where used, the gel breaker is generally present in the treating fluid in an amount in the range of from about 0.01% to about 10% by weight of the aqueous fluid therein. Alternatively, any of the conventionally used delayed breakers employed with metal ion crosslinkers may be used, for example, oxidizers such as sodium chlorite, sodium hypochlorite, sodium bromate, sodium persulfate, ammonium persulfate, encapsulated sodium persulfate, potassium persulfate, or ammonium persulfate and the like as well as magnesium peroxide. Enzyme breakers that may be employed include alpha and beta amylases, amyloglucosidase, invertase, and maltase. The specific breaker or delinker used, whether or not it is encapsulated, as well as the amount thereof employed will depend upon the breaking time desired; the nature of the gellable agent, crosslinking agent, and/or the at least one polymer comprising one or more ortho-dioxy arylene units; formation characteristics and conditions; and other factors.

The treatment fluids of the embodiments of the present invention may include one or more of a variety of well-known additives which do not adversely react with the treatment fluids. Exemplary additives may include, but are not limited to, gel stabilizers (e.g., Gel-Sta™ from Halliburton), fluid loss control additives, clay stabilizers, biocides, bactericides, friction reducers, gas, surfactants, solubilizers, pH adjusting agents, and the like. For example, in some embodiments, it may be desired to foam a treatment fluid of the embodiments of the present invention using a gas, such as air, nitrogen, or carbon dioxide. Those of ordinary skill in the art, with the benefit of this disclosure, will be able to determine the appropriate additives for a particular application.

The treatment fluids of the embodiments of the present invention can be prepared by dissolving one or more of the components (e.g., a gellable agent, at least one polymer comprising one or more ortho-dioxy arylene units; and a crosslinking agent) in an aqueous fluid (e.g., seawater; produced water; and/or flowback water); combining one or more of the components in solid form, then adding an aqueous fluid; or dissolving one or more of the components and adding, to the solution, one or more of the components in solid form. The order in which the components are added, whether as a solution or in solid form, is not limiting. In some examples, a gellable agent in an aqueous carrier fluid is prepared first to form, in some instances, a gelled aqueous fluid. The at least one polymer comprising one or more ortho-dioxy arylene units can be combined with the gelled aqueous carrier fluid. The composition comprising the gellable agent and the at least one polymer comprising one or more ortho-dioxy arylene units can then be combined with the crosslinking agent, capable of causing crosslinking of the gellable agent and/or forming a complex with the at least one polymer comprising one or more ortho-dioxy arylene units and the crosslinked gellable agent. The gellable agent can be used as either a solid or a liquid gel concentrate in a pre-hydrated or slurried form using conventional mixing and pumping equipment. The at least one polymer comprising one or more ortho-dioxy arylene units can also be added to the aqueous carrier fluid as either a solid or a liquid concentrate using conventional mixing and pumping equipment. As is understood by those skilled in the art, in some embodiments, the crosslinker may be pumped and metered into the gelled aqueous fluid (e.g., a gelled aqueous fluid comprising the gellable agent alone or comprising the gellable agent and the at least one polymer comprising one or more ortho-dioxy arylene units), as the gelled aqueous fluid is pumped into the well bore. Additional components may be added into the treatment fluid with the gellable agent or on the fly as the gelled aqueous carrier fluid is pumped into the well bore.

In an embodiment, a method of using the treatment fluid of the embodiments of the present invention comprises obtaining or providing a treatment fluid comprising a gellable agent, an aqueous carrier fluid, at least one polymer comprising one or more ortho-dioxy arylene units, and a crosslinking agent; and contacting a subterranean formation with the treatment fluid. The treatment fluid of the embodiments of the present invention may be used for any treatment or subterranean operation known to one of ordinary skill in the art.

In an embodiment, a method of using the treatment fluid of the embodiments of the present invention comprises contacting a subterranean formation with a treatment fluid comprising a gellable agent, an aqueous carrier fluid, at least one polymer comprising one or more ortho-dioxy arylene units, and a crosslinking agent.

In an embodiment, the treatment fluid of the embodiments of the present invention is a fracturing fluid. Thus, the present invention provides for a method of fracturing a subterranean formation comprising the steps of (a) preparing a treatment fluid comprising a gellable agent, an aqueous carrier fluid, at least one polymer comprising one or more ortho-dioxy arylene units, and a crosslinking agent; (b) introducing the treatment fluid into a subterranean formation at a rate and pressure whereby fractures are formed in the subterranean formation; and (c) optionally introducing proppant into the newly created fractures at a rate and pressure whereby the fractures are propped open during the producing life of the subterrarnean formation. In some embodiments, the subterranean formation is penetrated by a well bore. In other embodiments, the well bore has a temperature above about 200° F. In still other embodiments, the crosslinking agent is capable of causing crosslinking of the gellable agent and/or forming a complex with the at least one polymer comprising one or more ortho-dioxy arylene units and the crosslinked gellable agent.

In some embodiments, the present invention provides a system comprising a treatment fluid comprising a gellable agent; an aqueous carrier fluid; at least one polymer comprising one or more ortho-dioxy arylene units; a crosslinking agent; and a subterranean formation comprising the treatment fluid.

The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those of ordinary skill in the art, and that such modifications and variations are considered to be within the scope of this invention as defined by the appended claims.

EXAMPLES

The present invention can be better understood by reference to the following examples which are offered by way of illustration. The present invention is not limited to the examples given herein.

Example 1

For preparing 1 liter of the treatment fluid, 4.8 g of carboxymethylhydroxypropylguar (CMHPG) was hydrated in 800 mL of synthetic water for 30 minutes. The synthetic water has the composition of dissolved salts shown in Table 1:

TABLE 1

| Component Number | Dissolved Component | Concentration (mg/L) |
| --- | --- | --- |
| 1 | Bicarbonate | 1200 |
| 2 | Chloride | 89200 |
| 3 | Sulfate | 434 |
| 4 | Calcium | 18800 |
| 5 | Magnesium | 2300 |
| 6 | Barium | 260 |
| 7 | Strontium | 6300 |
| 8 | Iron | — |
| 9 | Potassium | 1500 |
| 10 | Sodium | 26200 |
| Total Dissolved Solids (TDS) | | 146194 |
| pH | | 6.5 |

In a separate beaker, ammonium lignosulfonate (1.66 g; ALS) was dissolved in 200 mL of water using a magnetic stirrer to form a homogeneous solution. The ALS solution was then added to the hydrated gel and stirred for 5 minutes. The crosslinker CL-18™ (1.6 gallon per thousand, gpt; Halliburton) was then added to the CMHPG and ALS homogenous mixture and stirred for another 2 to 3 minutes. The crosslinked gel was loaded into a high-pressure/high-temperature (HP/HT) Chandler 5550 viscometer with a B5X bob, and the viscosity versus time and temperature was monitored at a shear rate of 81 sec$^{-1}$ to conduct rheology tests at 200° F. See FIG. 1.

Example 2

For conducting rheology tests at 250° F. (see FIG. 2), a treatment fluid was prepared in a fashion similar to that described in Example 1 except once the CMHPG was substantially hydrated (approximately in 30 minutes), a gel stabilizer, Gel-Sta™ (20-30 pounds) was added and the gel was stirred for 5 minutes. The ALS solution was then added to the hydrated gel and stirred for 5 minutes. The crosslinker CL-18™ (1.6 gpt) was then added to the CMHPG and ALS and stirred for another 2 to 3 minutes. The treatment fluid was loaded into a HP/HT Chandler 5550 viscometer with a B5X bob, and the viscosity versus time and temperature was monitored at a shear rate of 81 sec$^{-1}$. See FIG. 2.

Figure 2:
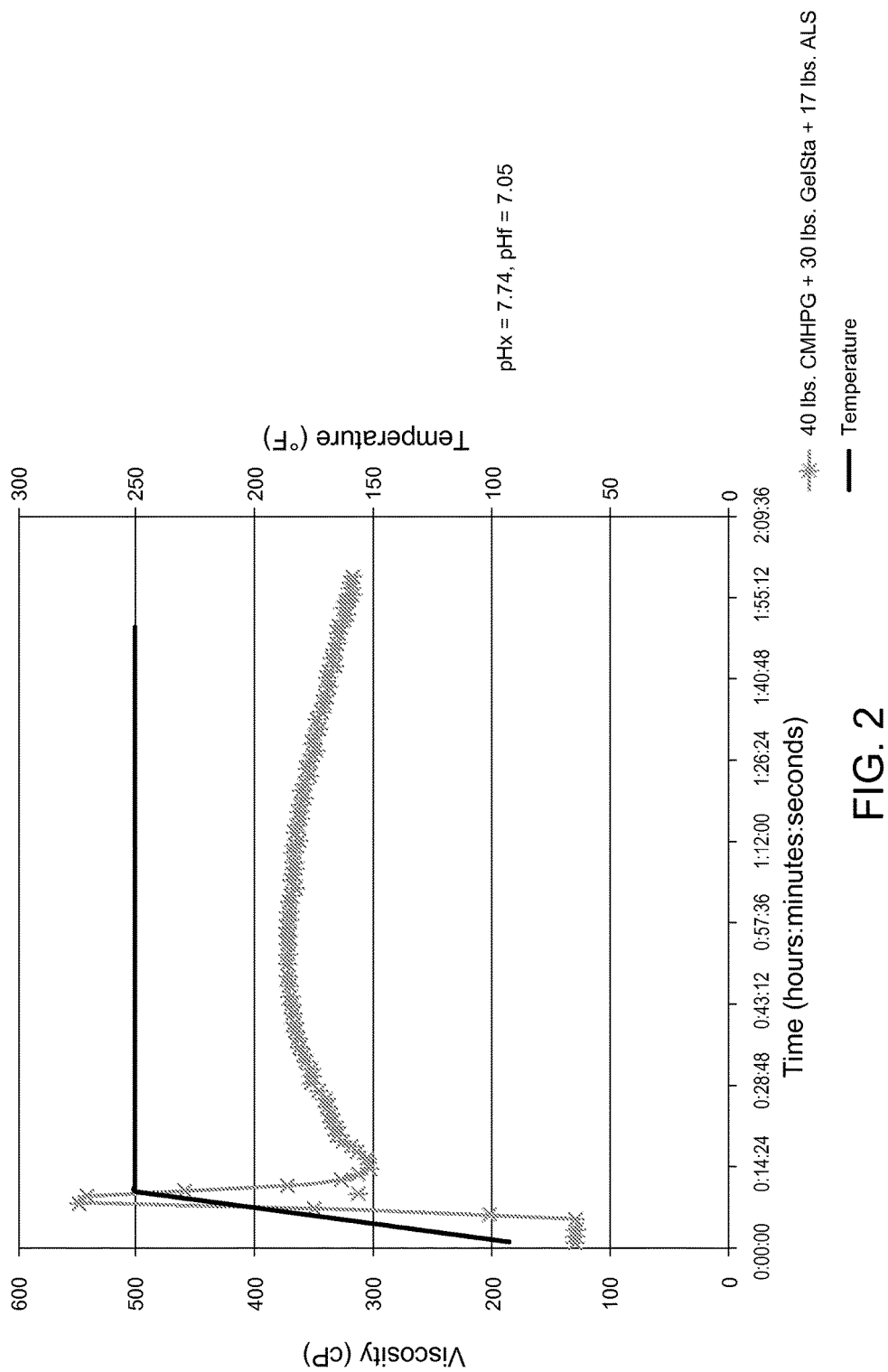
FIG. 2 is rheology profile for a representative treatment fluid at 250° F., the treatment fluid comprising 40 lbs. CMHPG, 17 lbs. ALS, 1.6 gpt CL-18™, 30 lbs. Gel-Sta™ and synthetic produced water (pHx 7.74 and pHf 7.05).

FIGS. 1 and 2 are rheology profiles for treatment fluids at 200° F. and 250° F., respectively. As shown in FIGS. 1 and 2, the initial viscosity of the fluids is in the range 100 to 200 cP; rises to approximately 550 cP after crosslinking; and at the end of two hours the retained viscosity is in the range 300 to 400 cP at shear rate 81 sec$^{-1}$ at the respective temperature.

Example 3

For preparing 1 liter of treatment fluid, 4.8 g of CMHPG was hydrated in 800 mL of produced water obtained from the Barnet Shale Reservoir for 30 minutes. The produced water has the composition of dissolved monovalent and multivalent salts shown in Table 2:

TABLE 2

| Component Number | Dissolved Component | Concentration (mg/L) |
| --- | --- | --- |
| 1 | Bromide | 237 |
| 2 | Nitrite | 14.4 |
| 3 | Chloride | 42060 |
| 4 | Sulfate | 1761 |
| 5 | Calcium | 2650 |
| 6 | Magnesium | 536 |
| 7 | Barium | 567 |
| 8 | Strontium | 900 |
| 9 | Iron | — |
| 10 | Potassium | 74 |
| 11 | Sodium | 18800 |
| Total Dissolved Solids (TDS) | | 67599 |
| pH | | 6.5 |

In a separate beaker, ALS (1.66 g) was dissolved in 200 mL of water using a magnetic stirrer. The ALS solution was then added to the hydrated gel and stirred for 5 minutes. The crosslinker CL-18™ (1.6 gpt) was then added to the CMHPG and ALS and stirred for another 2 to 3 minutes. The treatment fluid was loaded into a HP/HT Chandler 5550 viscometer with a B5X bob, and the viscosity versus time and temperature was monitored at a shear rate of 81 sec$^{-1}$ to conduct rheology tests at 200° F. See FIG. 3.

Figure 3:
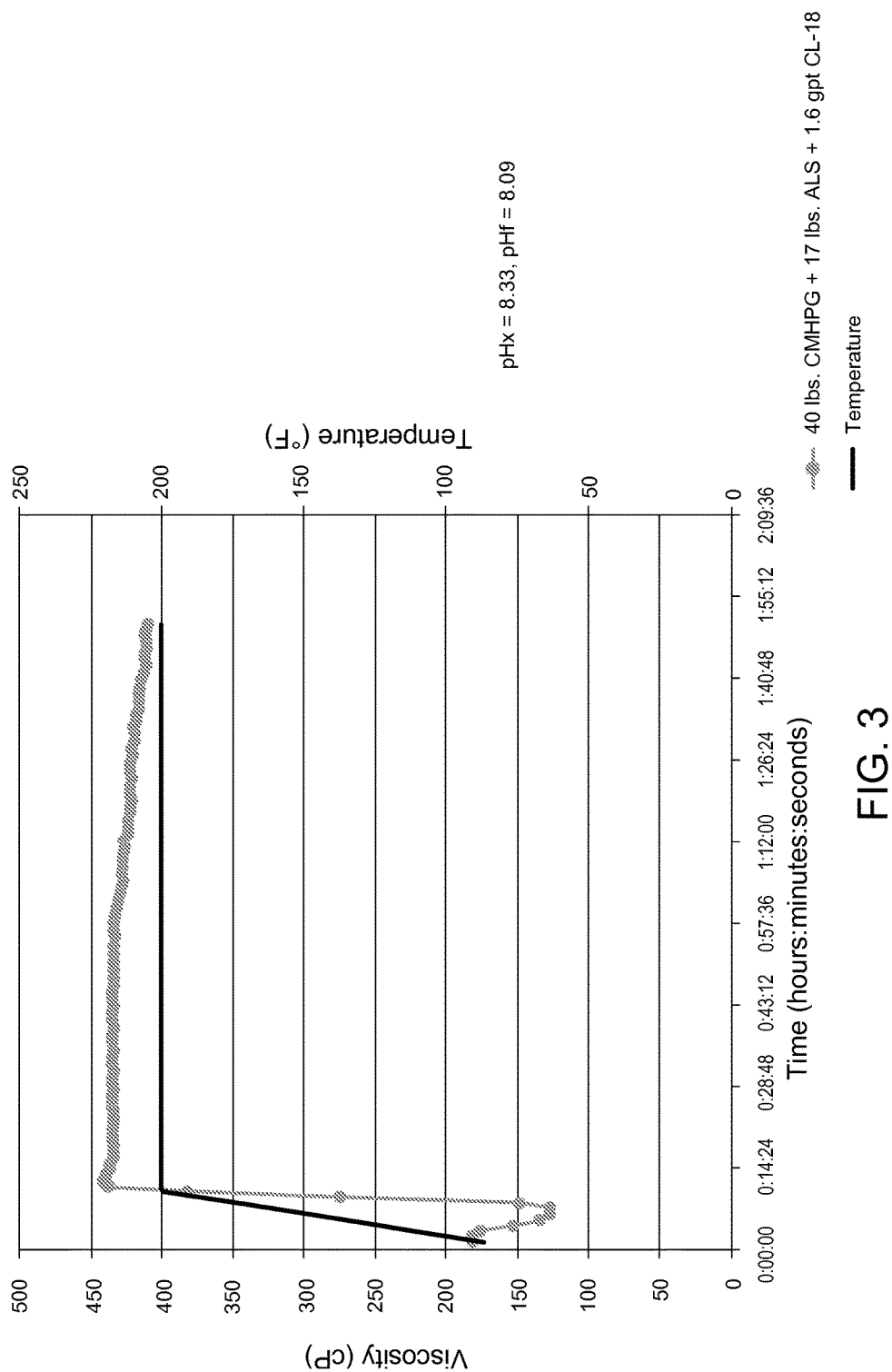
FIG. 3 is rheology profile for a representative treatment fluid at 200° F., the treatment fluid comprising 40 lbs. CMHPG, 17 lbs. ALS, 1.6 gpt CL-18™, and produced water from the Barnett Shale reservoir (pHx 8.33 and pHf 8.09).

FIG. 3 shows that produced water can be used to prepare treatment fluid. Treatment fluid thus prepared has a viscosity above 400 cP and retains that viscosity for at least two hours at 200° F. The data shown in FIG. 3 also shows that at least the combination of CMHPG and ALS can be used to prepare treatment fluids using high salt concentration systems, including produced water, flowback water or high density brines.

Example 4

Figure 4:
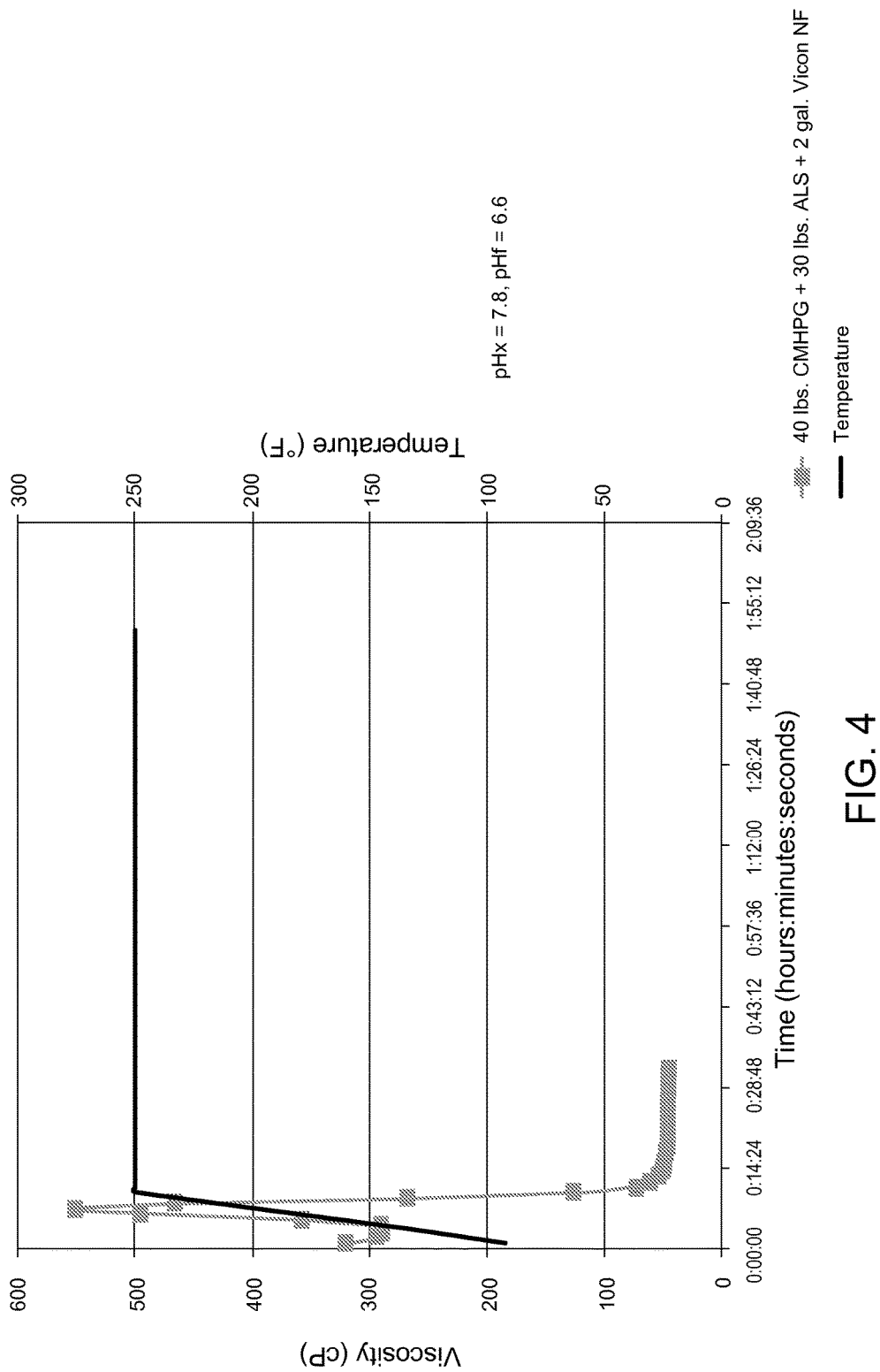
FIG. 4 is rheology profile for a representative treatment fluid at 250° F., the treatment fluid comprising 40 lbs. CMHPG, 17 lbs. ALS, 1.6 gpt CL-18™, 2 gpt Vicon NF™, and synthetic produced water (pHx 7.80 and pHf 6.60).

The treatment fluid described in Example 1 was break tested with an existing breaker system, namely, ViCon NF™ to determine if such a breaker system could successfully break the cross linked gel to linear gel within a reasonable amount of time. The rheology profile for the break test is given in FIG. 4. FIG. 4 shows that the treatment fluid made according to Example 1 breaks within 14 minutes of being treated with 2 gpt Vicon NF™.

Example 5

Control experiments were conducted to demonstrate that a combination of the gellable agent and the at least one polymer comprising one or more ortho-dioxy arylene units is required to prepare the treatment fluids of the embodiments of the present invention. These experiments demonstrate that a gellable agent/crosslinking agent combination and an at least one polymer comprising one or more ortho-dioxy arylene units/crosslinking agent combination do not provide treatment fluids having a viscosity that is sufficiently high, and is maintained for a sufficient period of time, for them to be used as treatment fluids, especially fracturing fluids.

Figure 5:
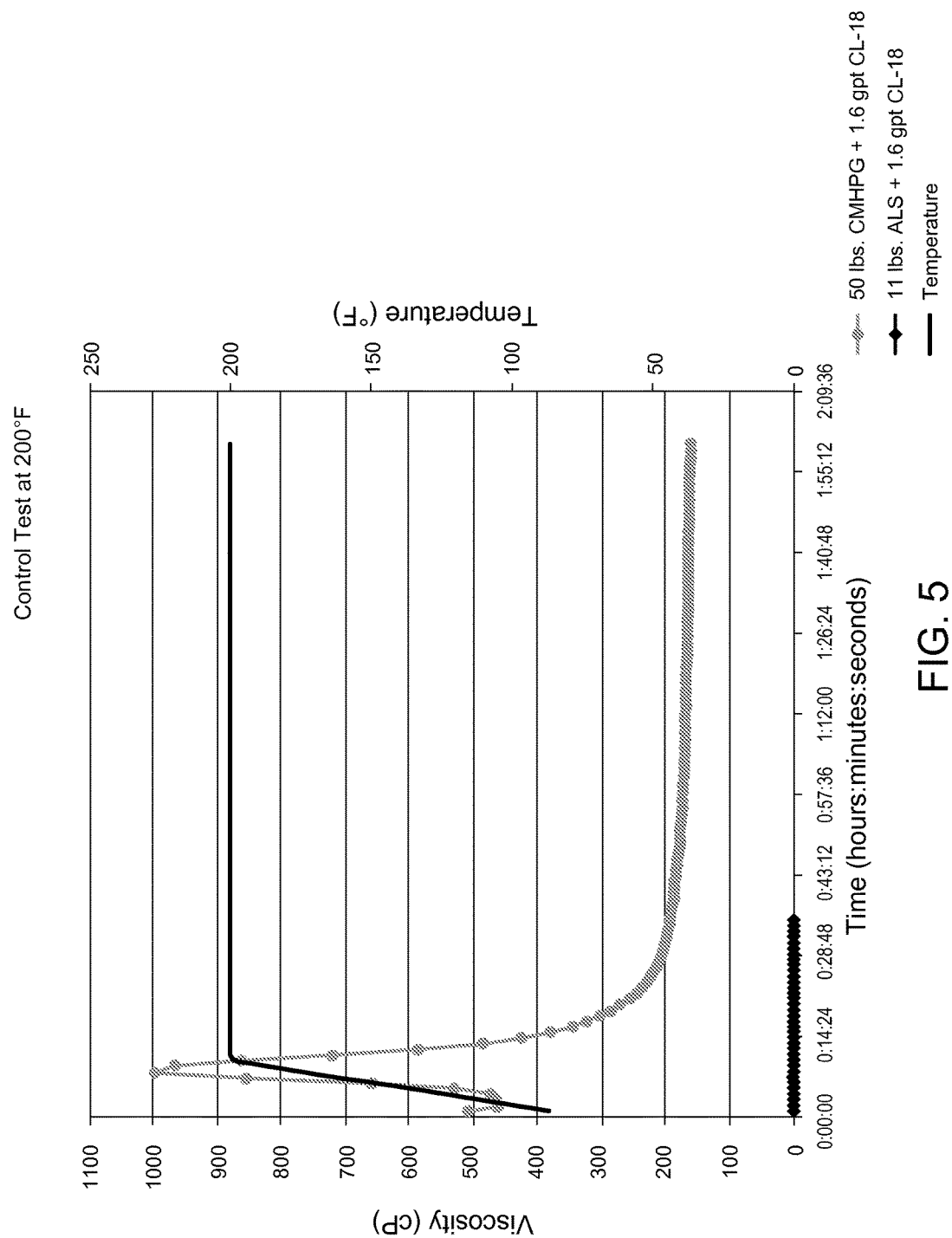
FIG. 5 is a rheology profile for controls comprising CMHPG/CL-18™ (filler circles) and ALS/CL-18™ (filled diamonds) at 200° F. using synthetic produced water.

FIG. 5 is a rheology profile for CMHPG/CL-18™ (50 lb CMHPG and 1.6 gpt CL-18) and ALS/CL-18™ (11 lbs. ALS and 1.6 gpt CL-18) at 200° F. using synthetic water. Fluids made with CMHPG/CL-18™ did not maintain a viscosity above 200 cP at 200° F. for more than about 20 minutes. Fluids made with ALS/CL-18™ did not exhibit an increase of viscosity at 200° F. at all. These data demonstrate that a combination of the gellable agent and the at least one polymer comprising one or more ortho-dioxy arylene units is required to prepare the treatment fluids of the embodiments of the present invention. These data also demonstrate that the gellable agent works synergistically with the at least one polymer comprising one or more ortho-dioxy arylene units to provide treatment fluids having a viscosity that is sufficiently high, and is maintained for a sufficient period of time, for them to be used as treatment fluids, especially fracturing fluids.

The present invention provides for the following exemplary embodiments, the numbering of which is not to be construed as designating levels of importance:

Embodiment 1 relates to a method comprising obtaining or providing a treatment fluid comprising a gellable agent; an aqueous carrier fluid; at least one polymer comprising one or more ortho-dioxy arylene units; and a crosslinking agent; and placing the treatment fluid in a subterranean formation.

Embodiment 2 relates to the method of Embodiment 1, wherein the treatment fluid comprises a fracturing fluid, remedial treatment fluid or stimulation fluid.

Embodiment 3 relates to the method of Embodiments 1-2, wherein the treatment fluid comprises a fracturing fluid.

Embodiment 4 relates to the method of Embodiments 1-3, wherein the gellable agent comprises a galactomannan gum.

Embodiment 5 relates to the method of Embodiment 4, wherein the galactomannan gum comprises modified or derivatized galactomannan gums.

Embodiment 6 relates to the method of Embodiment 4, wherein the galactomannan gum comprises guar gum, hydroxypropylguar, carboxymethylhydroxypropylguar (CMHPG), carboxymethylguar, or combinations thereof.

Embodiment 7 relates to the method of Embodiment 4, wherein the galactomannan gum comprises carboxymethylhydroxypropylguar (CMHPG).

Embodiment 8 relates to the method of Embodiments 1-7, wherein the aqueous carrier fluid comprises seawater, produced water, flowback water, fresh water, saltwater or combinations thereof.

Embodiment 9 relates to the method of Embodiments 1-8, wherein the aqueous carrier fluid comprises produced water.

Embodiment 10 relates to the method of Embodiments 1-9, wherein the aqueous carrier fluid comprises flowback water.

Embodiment 11 relates to the method of Embodiment 1-10, wherein the aqueous carrier fluid comprises high total dissolved solids.

Embodiment 12 relates to the method of Embodiment 11, wherein high total dissolved solids comprises total dissolved solids ranging from about 50,000 mg/L to about 200,000 mg/L.

Embodiment 13 relates to the method of Embodiments 1-12, wherein the at least one polymer comprising one or more ortho-dioxy arylene units also acts as a buffer.

Embodiment 14 relates to the method of Embodiment 13, wherein the treatment fluid does not comprise additional buffer or other pH adjusting agent other than the at least one polymer comprising one or more ortho-dioxy arylene units.

Embodiment 15 relates to the method of Embodiments 1-14, wherein the at least one polymer comprising one or more ortho-dioxy arylene units comprises ammonium lignosulfonate, calcium lignosulfonate or combinations thereof.

Embodiment 16 relates to the method of Embodiments 1-15, wherein the crosslinking agent comprises a metal ion that crosslinks at least two molecules of the crosslinkable gellable agent and/or forms a complex with crosslinked gellable agent and the at least one polymer comprising one or more ortho-dioxy arylene units.

Embodiment 17 relates to the method of Embodiments 1-16, wherein the crosslinking agent comprises borate ions, titanium ions, organotitanates or triethylamine titanium complexes.

Embodiment 18 relates to the method of Embodiments 1-17, wherein the crosslinking agent comprises boric acid, disodium octaborate tetrahydrate, sodium diborate, pentaborates, ulexite, colemanite, titanium oxychloride, chelates of zirconium, derivatives thereof, or combinations thereof.

Embodiment 19 relates to the method of Embodiments 1-15, wherein the treatment fluid has a viscosity that is sufficiently high for it to be used as a fracturing fluid.

Embodiment 20 relates to the method of Embodiment 19, wherein the treatment fluid has a viscosity ranging from about 300 cP to about 600 cP at a shear rate of about 80 sec-1 at a temperature from about 200° F. to about 300° F.

Embodiment 21 relates to the method of Embodiment 19, wherein the treatment fluid has a viscosity ranging from about 300 cP to about 600 cP at a shear rate of about 80 sec-1 at a temperature from about 200° F. to about 300° F. for from about 2 hours to about 5 hours after the treatment fluid is prepared.

Embodiment 22 relates to the method of Embodiments 1-21, wherein the treatment fluid has a pH of from about 7.5 to about 10.

Embodiment 23 relates to the method of Embodiments 1-22, wherein the treatment fluid comprises at least two molecules of the crosslinkable gellable agent crosslinked via the crosslinking agent.

Embodiment 24 relates to the method of Embodiments 1-23, wherein the crosslinking agent crosslinks the gellable agent and/or forms a complex with the at least one polymer comprising one or more ortho-dioxy arylene units and crosslinked gellable agent.

Embodiment 25 relates to a method comprising placing a treatment fluid comprising a gellable agent; an aqueous carrier fluid; at least one polymer comprising one or more ortho-dioxy arylene units; and a crosslinking agent; in a subterranean formation.

Embodiment 26 relates to a method comprising placing a treatment fluid comprising a gellable agent comprising a galactomannan gum; an aqueous carrier fluid comprising seawater, produced water, flowback water, fresh water, saltwater or combinations thereof; at least one polymer comprising one or more ortho-dioxy arylene units comprising ammonium lignosulfonate, calcium lignosulfonate or combinations thereof; and a crosslinking agent; in a subterranean formation.

Embodiment 27 relates to a composition comprising a gellable agent; an aqueous carrier fluid; at least one polymer comprising one or more ortho-dioxy arylene units; and a crosslinking agent.

Embodiment 28 relates to the composition of Embodiment 27, wherein the treatment fluid comprises a fracturing fluid, remedial treatment fluid or stimulation fluid.

Embodiment 29 relates to the composition of Embodiments 27-28, wherein the treatment fluid comprises a fracturing fluid.

Embodiment 30 relates to the composition of Embodiments 27-29, wherein the gellable agent comprises a galactomannan gum.

Embodiment 31 relates to the composition of Embodiment 30, wherein the galactomannan gum comprises modified or derivatized galactomannan gums.

Embodiment 32 relates to the composition of Embodiment 30, wherein the galactomannan gum comprises guar gum, hydroxypropylguar, carboxymethylhydroxypropylguar (CMHPG), carboxymethylguar, or combinations thereof.

Embodiment 33 relates to the composition of Embodiment 30, wherein the galactomannan gum comprises carboxymethylhydroxypropylguar (CMHPG).

Embodiment 34 relates to the composition of Embodiments 27-33, wherein the aqueous carrier fluid comprises seawater, produced water, flowback water, fresh water, saltwater or combinations thereof.

Embodiment 35 relates to the composition of Embodiments 27-34, wherein the aqueous carrier fluid comprises produced water.

Embodiment 36 relates to the composition of Embodiments 27-35, wherein the aqueous carrier fluid comprises flowback water.

Embodiment 37 relates to the composition of Embodiments 27-36, wherein the aqueous carrier fluid comprises high total dissolved solids.

Embodiment 38 relates to the composition of Embodiment 37, wherein high total dissolved solids comprises total dissolved solids ranging from about 50,000 mg/L to about 200,000 mg/L.

Embodiment 39 relates to the composition of Embodiments 27-38, wherein the at least one polymer comprising one or more ortho-dioxy arylene units also acts as a buffer.

Embodiment 40 relates to the composition of Embodiment 39, wherein the treatment fluid does not comprise additional buffer or other pH adjusting agent other than the at least one polymer comprising one or more ortho-dioxy arylene units.

Embodiment 41 relates to the composition of Embodiments 27-40, wherein the at least one polymer comprising one or more ortho-dioxy arylene units comprises ammonium lignosulfonate, calcium lignosulfonate or combinations thereof.

Embodiment 42 relates to the composition of Embodiments 27-41, wherein the crosslinking agent comprises a metal ion that crosslinks at least two molecules of the crosslinkable gellable agent and/or forms a complex with the crosslinked gellable agent and the at least one polymer comprising one or more ortho-dioxy arylene units.

Embodiment 43 relates to the composition of Embodiments 27-42, wherein the crosslinking agent comprises borate ions, titanium ions, organotitanates or triethylamine titanium complexes.

Embodiment 44 relates to the composition of Embodiments 27-43, wherein the crosslinking agent comprises boric acid, disodium octaborate tetrahydrate, sodium diborate, pentaborates, ulexite, colemanite, titanium oxychloride, chelates of zirconium, derivatives thereof, or combinations thereof.

Embodiment 45 relates to the composition of Embodiments 27-44, wherein the treatment fluid has a viscosity that is sufficiently high for it to be used as a fracturing fluid.

Embodiment 46 relates to the composition of Embodiment 45, wherein the treatment fluid has a viscosity ranging from about 300 cP to about 600 cP at a shear rate of about 80 sec-1 at a temperature from about 200° F. to about 300° F.

Embodiment 47 relates to the composition of Embodiment 45, wherein the treatment fluid has a viscosity ranging from about 300 cP to about 600 cP at a shear rate of about 80 sec-1 at a temperature from about 200° F. to about 300° F. for from about 2 hours to about 5 hours after the treatment fluid is prepared.

Embodiment 48 relates to the composition of Embodiments 27-47, wherein the treatment fluid has a pH of from about 7.5 to about 10.

Embodiment 49 relates to the composition of Embodiments 27-48, wherein the treatment fluid comprises at least two molecules of the crosslinkable gellable agent crosslinked via the crosslinking agent.

Embodiment 50 relates to the composition of Embodiments 27-49, wherein the crosslinking agent crosslinks the gellable agent and/or forms a complex with the at least one polymer comprising one or more ortho-dioxy arylene units and the crosslinked gellable agent.

Embodiment 51 relates to a system comprising a treatment fluid comprising a gellable agent; an aqueous carrier fluid; at least one polymer comprising one or more ortho-dioxy arylene units; and a crosslinking agent; and a subterranean formation comprising the treatment fluid.

What is claimed is:

1. A method comprising:
    obtaining or providing a treatment fluid consisting of:
        a gellable agent;
        an aqueous carrier fluid, wherein the aqueous carrier fluid has a total dissolved solids ranging from about 20,000 mg/L to about 250,000 mg/L;
        at least one polymer having one or more ortho-dioxy arylene units; and
        a crosslinking agent; and
    placing the treatment fluid in a subterranean formation.

2. The method of claim 1, wherein the gellable agent is a galactomannan gum.

3. The method of claim 2, wherein the galactomannan gum is a modified or derivatized galactomannan gum.

4. The method of claim 2, wherein the galactomannan gum is selected from the group consisting of guar gum, hydroxypropylguar, carboxymethylhydroxypropylguar (CMHPG), carboxymethylguar, or combinations thereof.

5. The method of claim 2, wherein the galactomannan gum is carboxymethylhydroxypropylguar (CMHPG).

6. The method of claim 1, wherein the aqueous carrier fluid is selected from the group consisting of seawater, produced water, flowback water, fresh water, saltwater and combinations thereof.

7. The method of claim 1, wherein the aqueous carrier fluid is synthetic water.

8. The method of claim 1, wherein the aqueous carrier fluid is flowback water.

9. The method of claim 1, wherein the aqueous carrier fluid has total dissolved solids ranging from about 50,000 mg/L to about 200,000 mg/L.

10. The method of claim 9, wherein the aqueous carrier fluid has total dissolved solids ranging from about 100,000 mg/L to about 200,000 mg/L.

11. The method of claim 1, wherein the at least one polymer having one or more ortho-dioxy arylene units also acts as a buffer.

12. The method of claim 11, wherein the treatment fluid does not comprise additional buffer or other pH adjusting agent other than the at least one polymer having one or more ortho-dioxy arylene units.

13. The method of claim 1, wherein the at least one polymer having one or more ortho-dioxy arylene units is selected from the group consisting of ammonium lignosulfonate, calcium lignosulfonate, and combinations thereof.

14. The method of claim 1, wherein the crosslinking agent is a metal ion that crosslinks at least two molecules of the gellable agent and/or forms a complex with crosslinked gellable agent and the at least one polymer having one or more ortho-dioxy arylene units.

15. The method of claim 1, wherein the crosslinking agent is selected from the group consisting of borate ions, titanium ions, organotitanates and triethylamine titanium complexes.

16. The method of claim 1, wherein the crosslinking agent is selected from the group consisting of boric acid, disodium octaborate tetrahydrate, sodium diborate, pentaborates, ulexite, colemanite, titanium oxychloride, chelates of zirconium, derivatives thereof, and combinations thereof.

17. The method of claim 1, wherein the treatment fluid has a viscosity ranging from about 350 cP to about 450 cP at a shear rate of about 80 sec$^{-1}$ at a temperature from about 200° F. to about 300° F. and is used as a fracturing fluid.

18. The method of claim 1, wherein the treatment fluid has a viscosity ranging from about 300 cP to about 600 cP at a shear rate of about 80 sec$^{-1}$ at a temperature from about 200° F. to about 300° F.

19. The method of claim 1, wherein the treatment fluid has a viscosity ranging from about 300 cP to about 600 cP at a shear rate of about 80 sec$^{-1}$ at a temperature from about 200° F. to about 300° F. for a period from about 2 hours to about 5 hours after the treatment fluid is prepared.

20. The method of claim 1, wherein the treatment fluid has a pH of from about 7.5 to about 10.

21. The method of claim 1, wherein the treatment fluid has at least two molecules of the gellable agent crosslinked via the crosslinking agent.

22. The method of claim 1, wherein the crosslinking agent crosslinks the gellable agent and/or forms a complex with the at least one polymer having one or more ortho-dioxy arylene units and crosslinked gellable agent.

23. A method comprising:
placing a treatment fluid in a subterranean formation, the treatment fluid consisting of:
a gellable agent;
an aqueous carrier fluid, wherein the aqueous carrier fluid has a total dissolved solids ranging from about 20,000 mg/L to about 250,000 mg/L;
at least one polymer having one or more ortho-dioxy arylene units; and
a crosslinking agent.

24. A method comprising:
placing a treatment fluid consisting of:
a gellable agent being a galactomannan gum;
an aqueous carrier fluid selected from the group consisting of seawater, produced water, flowback water, fresh water, saltwater and combinations thereof;
at least one polymer having one or more ortho-dioxy arylene units selected from the group consisting of ammonium lignosulfonate, calcium lignosulfonate and combinations thereof; and
a crosslinking agent;
in a subterranean formation.

25. A composition consisting of:
a gellable agent;
an aqueous carrier fluid;
at least one polymer having one or more ortho-dioxy arylene units; and
a crosslinking agent.

26. The composition of claim 25, wherein the gellable agent is a galactomannan gum.

27. The composition of claim 26, wherein the galactomannan gum is a modified or derivatized galactomannan gum.

28. The composition of claim 26, wherein the galactomannan gum is selected from the group consisting of guar gum, hydroxypropylguar, carboxymethylhydroxypropylguar (CMHPG), carboxymethylguar, and combinations thereof.

29. The composition of claim 26, wherein the galactomannan gum is carboxymethylhydroxypropylguar (CMHPG).

30. The composition of claim 25, wherein the aqueous carrier fluid is selected from the group consisting of seawater, produced water, flowback water, fresh water, saltwater and combinations thereof.

31. The composition of claim 25, wherein the aqueous carrier fluid is produced water.

32. The composition of claim 25, wherein the aqueous carrier fluid is flowback water.

33. The composition of claim 25, wherein the aqueous carrier fluid has high total dissolved solids.

34. The composition of claim 33, wherein high total dissolved solids has total dissolved solids ranging from about 50,000 mg/L to about 200,000 mg/L.

35. The composition of claim 25, wherein the at least one polymer having one or more ortho-dioxy arylene units also acts as a buffer.

36. The composition of claim 35, wherein the treatment fluid does not comprise additional buffer or other pH adjusting agent other than the at least one polymer having one or more ortho-dioxy arylene units.

37. The composition of claim 25, wherein the at least one polymer having one or more ortho-dioxy arylene units is selected from the group consisting of ammonium lignosulfonate, calcium lignosulfonate and combinations thereof.

38. The composition of claim 25, wherein the crosslinking agent is a metal ion that crosslinks at least two molecules of the gellable agent and/or forms a complex with the crosslinked gellable agent and the at least one polymer having one or more ortho-dioxy arylene units.

39. The composition of claim 25, wherein the crosslinking agent is selected from the group consisting of borate ions, titanium ions, organotitanates or triethylamine titanium complexes.

40. The composition of claim 25, wherein the crosslinking agent is selected from the group consisting of boric acid, disodium octaborate tetrahydrate, sodium diborate, pentaborates, ulexite, colemanite, titanium oxychloride, chelates of zirconium, derivatives thereof, and combinations thereof.

41. The composition of claim 25, wherein the treatment fluid has a viscosity that is sufficiently high for it to be used as a fracturing fluid.

42. The composition of claim 41, wherein the treatment fluid has a viscosity ranging from about 300 cP to about 600 cP at a shear rate of about 80 sec$^{-1}$ at a temperature from about 200° F. to about 300° F.

43. The composition of claim 41, wherein the treatment fluid has a viscosity ranging from about 300 cP to about 600 cP at a shear rate of about 80 sec$^{-1}$ at a temperature from about 200° F. to about 300° F. for from about 2 hours to about 5 hours after the treatment fluid is prepared.

44. The composition of claim 25, wherein the treatment fluid has a pH of from about 7.5 to about 10.

45. The composition of claim 25, wherein the treatment fluid comprises at least two molecules of the gellable agent crosslinked via the crosslinking agent.

46. The composition of claim 25, wherein the crosslinking agent crosslinks the gellable agent and/or forms a complex with the at least one polymer having one or more ortho-dioxy arylene units and the crosslinked gellable agent.

47. A system comprising:
    a treatment fluid consisting of:
        a gellable agent;
        an aqueous carrier fluid;
        at least one polymer having one or more ortho-dioxy arylene units; and
        a crosslinking agent; and
    a subterranean formation comprising the treatment fluid.

* * * * *